United States Patent
Zdrahal et al.

(10) Patent No.: US 9,216,612 B2
(45) Date of Patent: Dec. 22, 2015

(54) MECANUM WHEEL AND MECANUM-WHEELED VEHICLE

(75) Inventors: Pavel Zdrahal, Pfaeffikon (CH);
Baudouin Uebelhart, Oberdorf (CH);
Zdenek Spindler, Usti nad Orlici (CZ)

(73) Assignee: Omniroll AG, Oberdorf (DE)

( * ) Notice: Subject to any disclaimer, the term of this patent is extended or adjusted under 35 U.S.C. 154(b) by 82 days.

(21) Appl. No.: 14/346,485

(22) PCT Filed: Aug. 16, 2012

(86) PCT No.: PCT/EP2012/065999
§ 371 (c)(1),
(2), (4) Date: Mar. 21, 2014

(87) PCT Pub. No.: WO2013/041310
PCT Pub. Date: Mar. 28, 2013

(65) Prior Publication Data
US 2014/0232174 A1 Aug. 21, 2014

(30) Foreign Application Priority Data
Sep. 23, 2011 (DE) .......................... 10 2011 053 903

(51) Int. Cl.
*B60B 19/12* (2006.01)
*B60B 19/00* (2006.01)
*B60B 11/02* (2006.01)
*B60B 33/00* (2006.01)
*B60B 33/04* (2006.01)

(52) U.S. Cl.
CPC .............. *B60B 19/003* (2013.01); *B60B 11/02* (2013.01); *B60B 19/125* (2013.01);
(Continued)

(58) Field of Classification Search
CPC .... B60B 19/003; B60B 19/12; B60B 19/125; B60B 11/00; B60B 11/02; B60B 11/04; B60B 11/06; B60B 33/0028; B60B 33/0042; B60B 33/0044; B60B 33/0052; B60B 33/045

USPC .............. 301/5.23, 5.301, 5.305, 5.1
See application file for complete search history.

(56) References Cited

U.S. PATENT DOCUMENTS

| 5,551,349 A | 9/1996 | Bodzin |
| 6,340,065 B1 | 1/2002 | Harris |
| 7,318,628 B2 * | 1/2008 | Guile ........................... 301/5.23 |

(Continued)

FOREIGN PATENT DOCUMENTS

| WO | 0126918 | 4/2001 |
| WO | 2011113562 | 9/2011 |

OTHER PUBLICATIONS

International Search report dated Jan. 16, 2013.

*Primary Examiner* — John Walters
(74) *Attorney, Agent, or Firm* — Bachman & LaPointe, PC

(57) ABSTRACT

A Mecanum wheel having a first wheel rim (2) which bears a multiplicity of rollers (4) which are arranged adjacent to one another in a circumferential direction and which are in each case mounted so as to be rotatable about a roller axis of rotation (38) arranged at an angle with respect to a first wheel rim axis of rotation (24), wherein said Mecanum wheel is characterized by a second wheel rim (3) which can be driven together with the first wheel rim (2) by means of a common drive shaft (33) and which bears a multiplicity of rollers (4) which are arranged adjacent to one another in a circumferential direction and which are in each case mounted so as to be rotatable about a roller axis of rotation (38) arranged at an angle with respect to a second wheel rim axis of rotation (25), which second wheel rim is connected to the first wheel rim (2) via damping means (7) formed so as to permit a limited relative movement of the first and the second rim (3) relative to one another. It is provided according to the invention that the damping means (7) are formed so as to permit a damped, limited relative movement between the first and the second wheel rim (2, 3) in the circumferential direction and/or perpendicular to a Mecanum wheel axis of rotation (9) and/or perpendicular to the first and/or to the second wheel rim axis of rotation (25) and/or at a tilt angle relative to one another.

16 Claims, 4 Drawing Sheets

(52) U.S. Cl.
CPC ........ *B60B 33/0028* (2013.01); *B60B 33/0042* (2013.01); *B60B 33/0044* (2013.01); *B60B 33/0052* (2013.01); *B60B 33/045* (2013.01); *B60B 2900/131* (2013.01); *B60Y 2200/10* (2013.01)

(56) References Cited

U.S. PATENT DOCUMENTS 7,980,335 B2 * 7/2011 Potter ............................ 180/7.1
2007/0096541 A1 5/2007 Guile

* cited by examiner

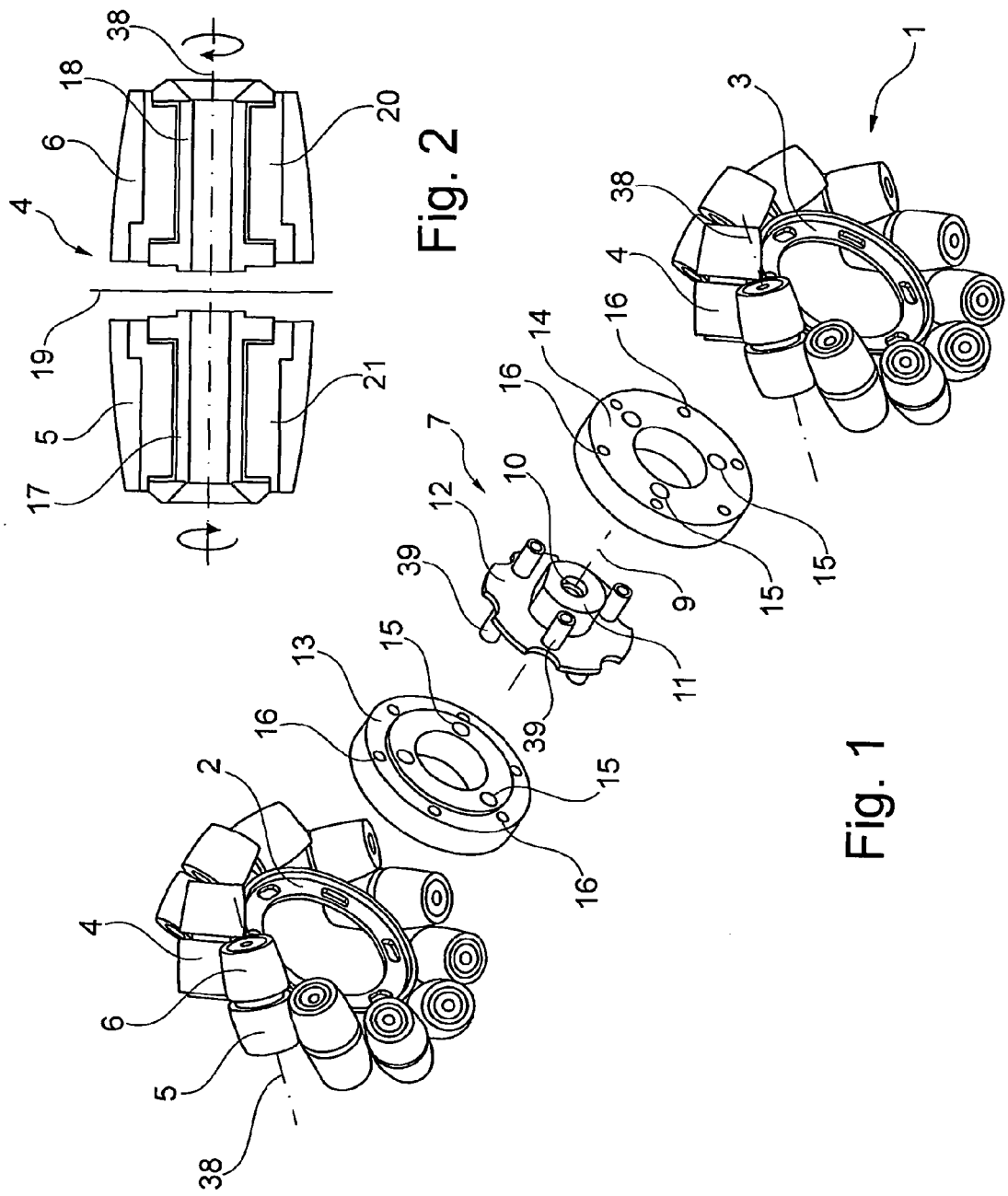

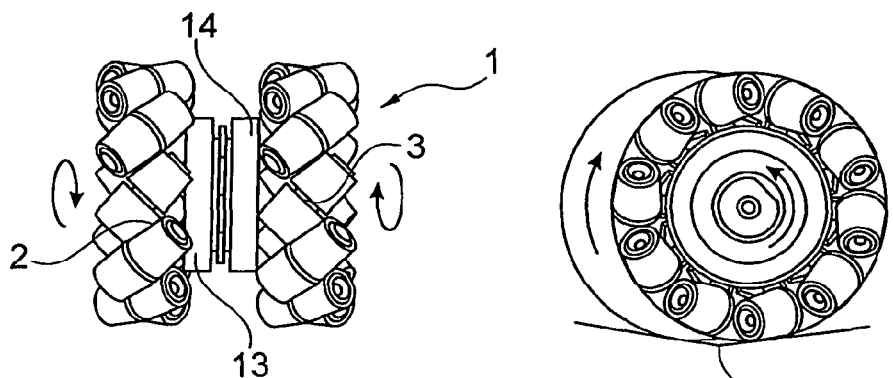
Fig. 5
Fig. 6
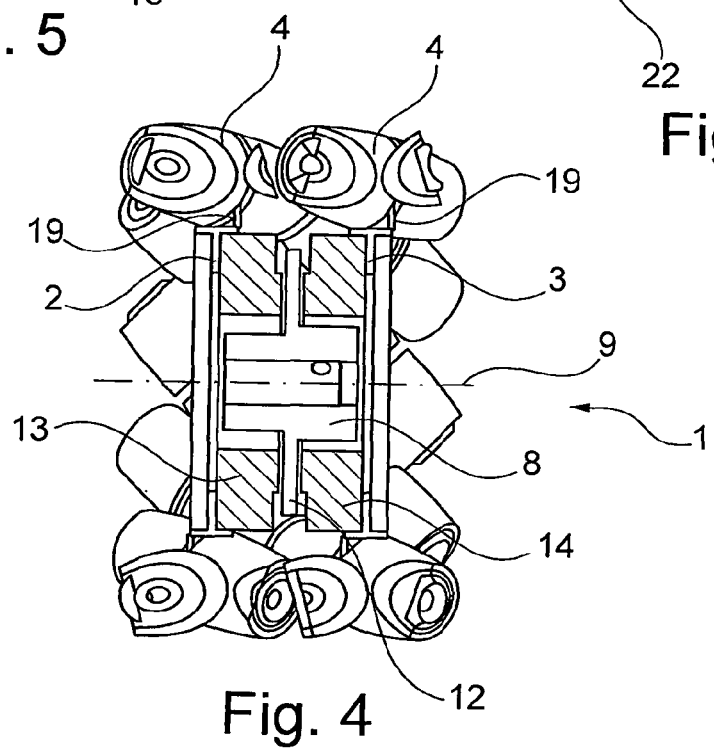
Fig. 4
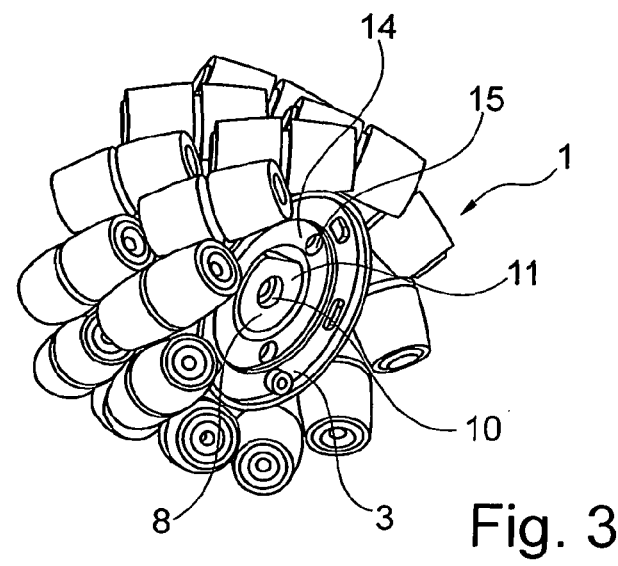
Fig. 3

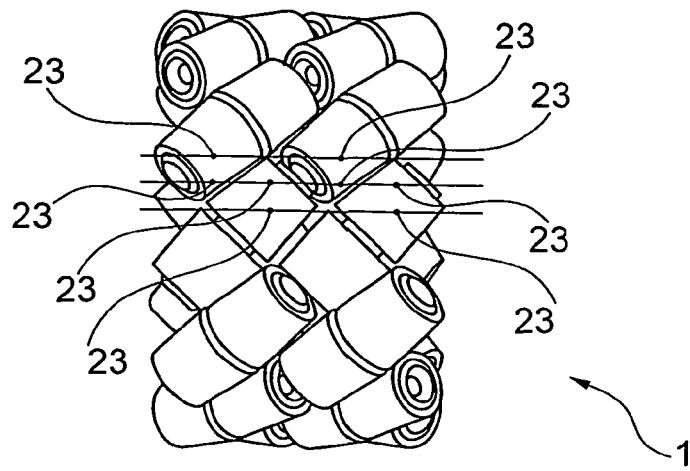
Fig. 7
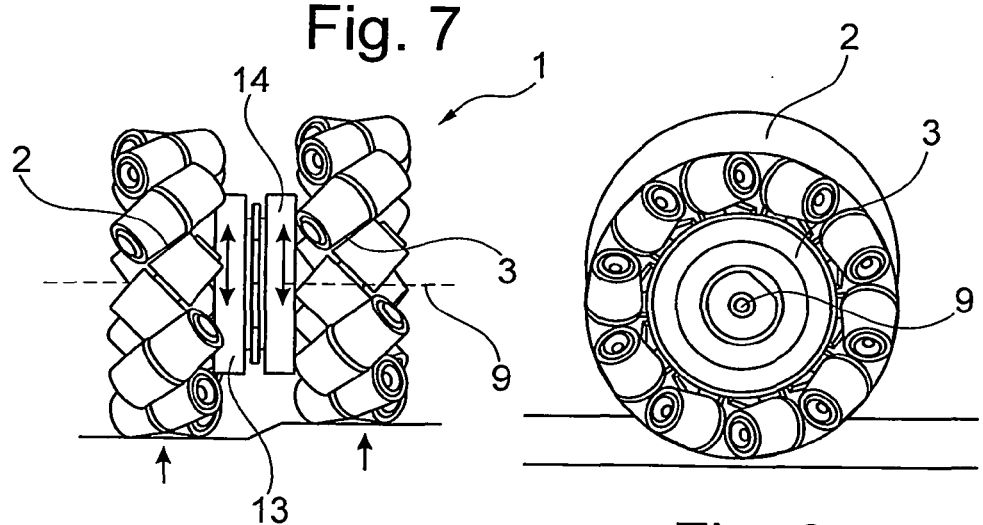
Fig. 8
Fig. 9
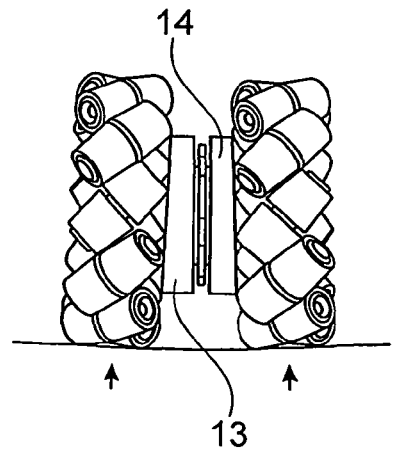
Fig. 10
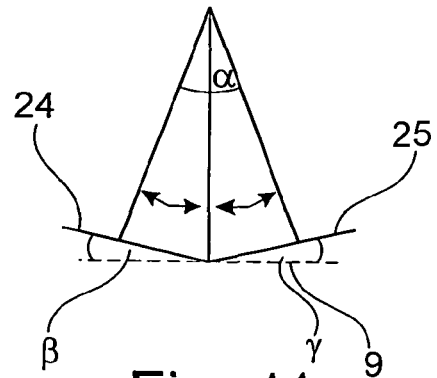
Fig. 11

MECANUM WHEEL AND MECANUM-WHEELED VEHICLE

BACKGROUND OF THE INVENTION

The invention relates to a Mecanum wheel for omnidirectional driving manoeuvres without mechanical steering, having a first rim carrying rollers arranged in a circumferential direction next to one another which are rotatably mounted about a roller axis of rotation that is arranged at an angle to a first rim axis of rotation. In other words, the rollers are rotatable about roller axes of rotation which are arranged at an angle to the first rim axis of rotation. Furthermore, the invention relates to a vehicle having a plurality of such Mecanum wheels.

Mecanum wheels are generally known. On the circumference of the rim of the wheel, multiple rotatably mounted rollers which as a rule are barrel-shaped are rotatably attached mostly at an angle of 45° to the axis of the rim and thus of the wheel. It is not the rim but exclusively the aforementioned rollers that establish contact with the ground. The rollers have no direct drive and can freely rotate about their respective roller axis of rotation. The entire Mecanum wheel by contrast can be driven by a drive motor with variable direction of rotation and variable rotational speed. The vehicles which are equipped with Mecanum wheels usually have four wheels, which are arranged in a rectangle. With known Mecanum wheel-operated vehicles, the inclined rotary roller axes are arranged on the support plane either star-like to the vehicle middle or the rotary roller axes are located on a circle projection. As mentioned, the rotational speed and the direction of rotation of each Mecanum wheel is to be activated individually, so that through individual direction of rotation selection of the Mecanum wheels relative to the road force, vectors are created which through the moveable rollers form two directions and in sum with the vectors of the other wheels add up to a total movement direction for the vehicle. In the past, attempts to achieve a breakthrough or widely distribute the Mecanum wheel drive were made in vain. Mecanum wheel-operated vehicles were developed for example in the form of conveying vehicles, wheelchairs for mobility impaired persons, transport vehicles or for robotics. The breakthrough of the technology has not been successful so far, presumably since during the rolling of the Mecanum wheels during the change in contact between two rollers which are adjacent in circumferential direction to the surface undefined driving states briefly result, in which the vehicle "floats" or does not follow a desired movement path in a defined manner.

From WO 2011/113562 A2 a Mecanum wheel vehicle is known, the Mecanum wheels of which comprise two rims each which are rotatable about a common driveshaft, wherein the rims for braking purposes are adjustable relative to one another along the common driveshaft axis. In this way, the rims can be adjusted towards one another and the rollers of the one rim braked on the respective other rim. The driving behaviour of the known Mecanum wheel vehicle is not improved through the described measure.

SUMMARY OF THE INVENTION

Starting out from the aforementioned prior art the invention is based on the object of stating a Mecanum wheel, with which undefined driving states are securely avoided. The Mecanum wheel is to be preferably suitable also for moving on surfaces which are not plane level. The object furthermore consists in stating a vehicle with such Mecanum wheels.

With respect to the Mecanum wheel having the features disclosed herein and with a generic Mecanum wheel, this object is solved in that the Mecanum wheel in addition to the first rim comprises a second rim, wherein these two rims are jointly rotatably connected via a driveshaft that is coupled or can be coupled to the Mecanum wheel, wherein the second rim, like the first rim, also comprises a plurality of rollers which are rotatably mounted about an axis of rotation which is arranged at an angle to a second rim axis of rotation arranged in a circumferential direction next to one another. Thus, multiple rollers rotating about roller axes of rotation arranged at an angle to the second rim axis of rotation are also provided with the second rim. The connection of the two rims to one another is effected according to the invention via damping means, which are formed permitting a limited relative movement of the first and the second rim to one another. According to the invention, the damping means are formed in such a manner that these permit a dampened, limited relative movement between the at least two rims in circumferential direction, that the rims in fact are rotatable relative to one another to a limited degree. Alternatively or preferably additionally, the damping means permit a kind of shearing movement or parallel displacement of the rims relative to one another, i.e. a relative movement perpendicular to a Mecanum wheel axis of rotation and/or perpendicularly to a first rim axis of rotation and/or perpendicularly to a second rim axis of rotation. Alternatively or preferably additionally, the damping means permit a relative tilting movement of the two rim axes of rotation to one another, in particular in each case in a camber angle range to a Mecanum wheel axis of rotation, which is preferably defined by a driveshaft.

With respect to the vehicle, the object is solved with the features disclosed herein, in particular in that multiple Mecanum wheels are provided on a platform and in that the Mecanum wheels are each driveable either via a common drive but preferentially via separate drives each assigned to one of the Mecanum wheels independently of one another with different rotational speeds and/or in different directions of rotation.

Advantageous further developments are also stated herein. The scope of the invention includes all combinations of at least two features disclosed in the description, the claims and/or the figures.

The invention has recognised that the reason for the driving behaviour perceived by a user as a floating, undefined driving state with known Mecanum wheels with exclusively one rim and with inclined rollers arranged on this rim next to one another in circumferential direction has its origins in that there are driving states, in particular during a change in contact between adjacent rollers to the surface, during which merely one of the rollers of the Mecanum wheel contacts the surface with a contact region that is more or less point-like. This can lead to a minimal drifting of the Mecanum wheel and thus of the vehicle. To eliminate this problem, the invention proposes to provide in addition to the first rim provided with rollers arranged inclined at least one further rim with rollers arranged inclined and to combine these in a Mecanum wheel, wherein the two rims are preferentially, as will still be explained later on, omnidirectional, moveable, rotatable, displaceable and tiltable within defined limits relative to one another. According to the invention, the damping means are designed in such a manner that these permit a dampened, limited relative movement between the at least two rims in circumferential direction, that the rims are thus rotatable against one another to a limited degree. Alternatively or preferably additionally, the damping means permit a type of shearing movement or parallel displacement of the rims relative to one another, i.e. a relative movement perpendicular to a Mecanum wheel axis of rotation and/or perpendicular to a first rim axis of rotation and/or perpendicular to a second rim axis of rotation. Alternatively or preferably additionally, the damping means permit a relative tilting movement of the two rim axes of rotation to one another, in particular in each case in a camber angle range to a Mecanum wheel axis of rotation, which is preferably defined by a driveshaft. In order to make possible a certain relative movement possibility of the two rims, the invention proposes to connect the two jointly driveable rims, i.e. the rims which except for a limited relative rotatability possibility which is provided if appropriate are connected to one another in a rotationally fixed manner via damping means which are formed in particular as hub shock absorbers, which on the one hand have the function of permitting and additionally limiting the previously mentioned relative movement possibility between the at least two rims in order to avoid impermissible relative positions of the rim to one another. The configuration of the Mecanum wheel according to the invention results in that for each operating state, i.e. for each relative rotary position of the at least two-rimmed Mecanum wheel relative to the surface it is ensured that the surface is contacted by at least two rollers of the Mecanum wheel—in other words, at least one roller of each rim of the Mecanum wheel contacts the surface at any time, as a result of which the undesirable drifting movements that occur in the prior art can be avoided. Through the spacing of the at least two contact points in the direction of the axis extension of the Mecanum wheel an optimised support of the wheel on the surface can be additionally ensured. Depending on the configuration of the Mecanum wheel, as will still be explained later on, even more than two contact regions of the Mecanum wheel to the surface can be ensured in most operating states.

In addition to this, it is substantial for the practical applicability of a vehicle equipped with Mecanum wheels designed according to the concept of the invention that both the rims which are each provided with rollers arranged inclined to the respective rim axis (the roller axes of rotation run inclined, i.e. at an angle to the respective rim axis of rotation) are not rigidly connected to one another, but are moveable relatively to one another to a limited extent, preferentially in the directions still to be explained later on, in order to be able to offset any irregularities of the surface occurring in practice in order to thereby again ensure that an at least two-point contact of each Mecanum wheel with the surface is ensured even with surfaces that are not optimally level.

With respect to the concrete configuration of the damping means there are a wide range of possibilities. It is particularly preferred when the damping means comprise at least one damping element of an elastomer material, which is formed and arranged so that it permits at least one of the aforementioned relative movements, preferably all of the aforementioned relative movements to a defined extent.

Preferably, the damping means for carrying the at least one damping element comprise a carrying part, relative to which at least one of the two rims is relatively moveable by means of the at least one damping element. Preferably, both rims are connected to the carrier part via, preferentially in each case, a damping element, in particular on one of the sides facing away, wherein it has proved to be particularly advantageous when the carrier part can be driven by a common driveshaft of at least two rims, in particular directly, wherein the driveshaft can be fixed on the carrier part or be unitarily formed with the latter. Preferably, the driveshaft is releasably coupled or can be coupled to the carrier part in a rotationally fixed manner. It is particularly practical when the carrier part is received between both rims and the driveshaft penetrates a central opening of an inner rim and can be connected to the carrier part. In the case of the direct drive of the carrier part from a driveshaft, a Mecanum wheel axis of rotation is defined by the axis of rotation of the carrier part, wherein preferentially at least one of the rim axes of rotation in particular all rim axes of rotation of the Mecanum wheel are moveable relative to this Mecanum wheel axis of rotation to a limited extent. In particular in circumferential direction and/or perpendicularly thereto and/or tilt-angularly or camber-angularly thereto. It is also conceivable to couple the driveshaft directly to a first rim and to connect the further (second rim) to the first rim via the damping means. In this less preferred case, the Mecanum wheel axis of rotation is determined by the first rim axis of rotation.

For connecting the carrier part to the at least one damping element, it has proved to be advantageous when the carrier part, with extensions preferentially orientated in the direction of the axis of rotation of the carrier part acts in corresponding recesses of the damping element, in particular in locations, preferably at least three, which are spaced in circumferential direction. It is preferred furthermore when the rim also acts in corresponding recesses in the dampening element from the other side, preferentially in circumferential direction and/or in radial direction offset to the engagement locations of the carrier part in the damping element. Most preferably, a damping element is provided on each face end of the carrier part, on which a rim each is fixed. In the case of the provision of two damping elements it is possible to design these differently or identically with respect to their damping behaviour.

With respect to an improvement of the driving behaviour of a vehicle equipped with Mecanum wheels formed according to the concept of the invention it has proved to be synergistic when in addition to the provision of rims each carrying multiple rollers at least one of the rollers of the first rim and/or one of the rollers of the second rim, preferably all rollers of the Mecanum wheel comprise at least two part rollers, which are rotatably mounted independently of one another, preferentially on an imaginary common axis of rotation. Here, the multi-part rollers are preferentially provided with a barrel-shaped sleeve contour, which is to mean that the diameter of the rollers decreases with increasing spacing from a centre plane. The part rollers of a roller are spaced from one another in the direction of the axis extension of the preferentially common axis of rotation of the part rollers, as a result of which in most operating states of the Mecanum wheel it is ensured that more than two, in particular four contact locations exist between the surface and the Mecanum wheel.

With respect to an advantageously designed configuration of the rollers it has proved to be advantageous when two part rollers forming a roller, i.e. a roller pair, are held on a common carrier, which starting out from the rim extends in a region between the rollers, wherein the carrier preferentially laterally engages in the rollers each with an arm and the rollers are each mounted relative to this arm with the help of at least one rolling bearing. Preferentially, the arms have a free end, i.e. support themselves only on the inside on the common carriers and are free on the outside.

It is conceivable in principle that the part rollers of a part roller pair are rotatable about part roller axes of rotation which are arranged angularly to one another—advantageously with respect to an optimal and defined movement of the Mecanum wheel however it has proved to be advantageous when the arms of the carrier define a common roller axis of rotation for the part rollers which are spaced from one another and are arranged rotatable relative to one another.

The provision of multiple part rollers each forming a roller opens up the possibility, according to a further development, to configure the part rollers of a part roller pair or of a roller with different surface structures and/or of different materials or surface materials for achieving desired or special driving characteristics. Additionally or alternatively it is possible to form the rollers of the first rim and the rollers of the second rim with a surface structure that is distinct from one another and/or of material that is distinct from one another. Thus it is possible for example to form the surface of the rollers of the first rim or only of part rollers from an elastomer material to provide the rollers and/or the part rollers of the second rim from a material that is distinct from that, for example of metal and/or to provide these rollers or part rollers with spikes or a coarse off-road tread. The invention also leads to a vehicle with at least one Mecanum wheel formed according to the concept of the invention, in particular with four Mecanum wheels formed according to the concept of the invention, wherein preferably each Mecanum wheel is assigned an even further preferred electric drive for driving the respective Mecanum wheel about a Mecanum wheel axis of rotation, wherein this Mecanum wheel axis of rotation in the case of fixed coupling of the driveshaft to one of the rims is defined by this rim axis or in the preferred case of the coupling of the driveshaft to a preferentially middle carrier part or damping elements by the axis of rotation of the carrier part. Obviously, the vehicle is provided with control means which are connected to the drives in a signal-conducting manner, in order to activate a vehicle direction that is desired by an operator or a predetermined or desired vehicle direction via a suitable activation of the drives in a manner known per se.

It has proved to be particularly practical when the at least one Mecanum wheel formed according to the concept of the invention is mounted by means of a bearing arm, wherein it is even further preferred when the bearing arm of the Mecanum wheel is directly mounted through an appropriate mounting of the drive. The bearing arm is dampened about a torsion axis spaced from the Mecanum wheel axis of rotation preferentially by means of a torsion spring element attached to a vehicle platform, pivotable in a limited angular range and/or pivotable or deflectable to a limited extent about a second bearing axis running perpendicularly to the torsion axis. It has proved to be most advantageous to employ rubber spring elements for mounting the bearing arm, for example rubber spring elements available on the market from the Rosta company with a slightly progressive spring characteristic curve.

BRIEF DESCRIPTION OF THE DRAWINGS

With respect to the further configuration of the vehicle formed according to the concept of the invention there is a wide range of possibilities. Thus, the vehicle can for example be formed as a passenger vehicle, in particular for mobility-impaired persons or as a utility vehicle. Advantageous further developments and details of the invention are obtained from the following description of preferred exemplary embodiments and with the help of the drawings.

These show in:

FIG. 1 an exploded representation of a preferred exemplary embodiment of a Mecanum wheel according to the invention, FIG. 2 the construction of a roller consisting of two part rollers (part roller pair), FIG. 3 a perspective inclined view of an assembled Mecanum wheel, FIG. 4 a sectional view through the Mecanum wheel according to FIG. 3, FIG. 5 and FIG. 6 different views of a Mecanum wheel from which the limited relative rotatability of the two rims is evident, FIG. 7 a representation of the Mecanum wheel from which it is evident that for each operating state or for each point in time at least two contact surfaces of the Mecanum wheel to the surface are ensured, FIG. 8 and FIG. 9 two different views of the Mecanum wheel (from which the parallel displaceability of the rims is evident), FIG. 10 a view of the Mecanum wheel from which the camber angle tiltability of the two rims relative to one another is evident, FIG. 11 a diagram of the maximum possible camber angle, and FIG. 12 an exploded representation of a Mecanum wheel with drive and a facultative, preferred mounting of the Mecanum wheel about a bearing arm that is pivotable and tiltable in a dampened manner.

DETAILED DESCRIPTION

Figure 12:
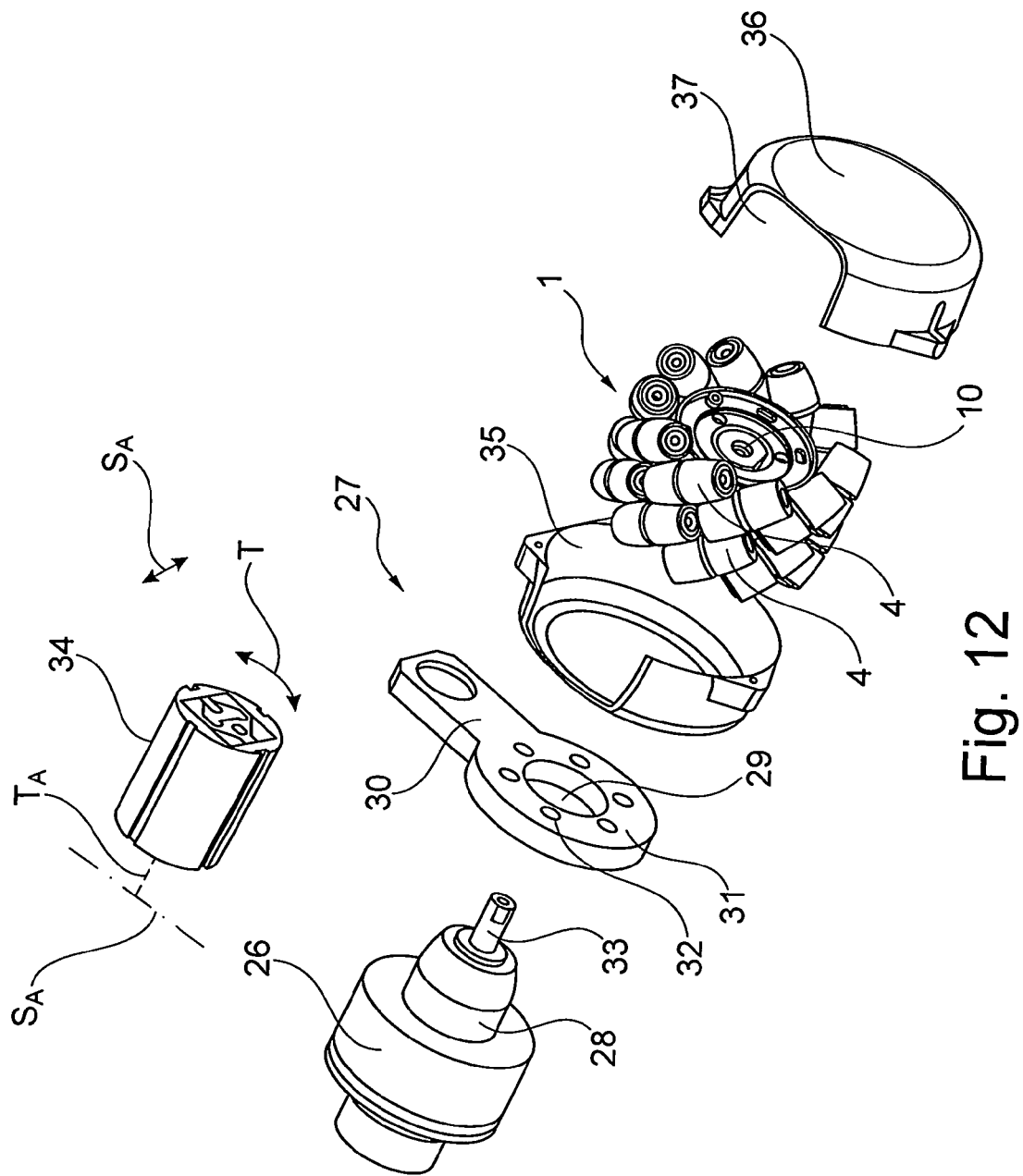

In the figures, same elements and elements with the same function are marked with the same reference characters.

With the help of FIG. 1, a preferred construction of a Mecanum wheel 1 according to the invention is described. This comprises in the shown exemplary embodiment 2 rims each formed as wheel rim, namely a first rim 2 and a second rim 3. Both rims 2, 3 are jointly (coupled) driveable with a drive that is not shown.

It is evident that on each rim 2, 3 multiple rollers 4 arranged next to one another in circumferential direction are rotatably arranged, wherein the rollers 4 have a barrel-shaped sleeve contour, the diameter of which decreases with increasing spacing from the roller middle. Each roller 4 consists of two part rollers, namely a first and a second part roller 5, 6, which will still be explained later on in particular by means of FIG. 5. The rollers 4 of both rims 2, 3 are rotatable about an imaginary roller axis 38 each, which extends angularly to the respective rim axis of rotation.

In a region between the two rims 2, 3 damping means 7 formed as hub shock absorbers are provided. In a preferred embodiment, these comprise a carrier part 8 arranged between the rims 2, 3, the axis of rotation of which defines a Mecanum wheel axis of rotation 9. The carrier part 8 is directly couplable to a driveshaft which is not shown of an in particular electric motor drive, wherein the carrier part 8 comprises a central shaft mounting 10.

In radial direction, a disc-shaped ring 12 extends from the hub region 11 comprising the shaft mounting 10, which ring 12 carries three extensions 13 each on each side which are evenly distributed in circumferential direction, onto which on two sides of the ring 12 facing away from one another a damping element 13, 14 each can be fitted and fixed through suitable screws, which are not shown, which can be screwed for example into the extensions 39. In the damping elements 13, 14, suitable mountings 15 for the extensions are provided. The rims 2, 3 are fixable in fixing mountings 16 with radial spacing from the mountings, in particular by means of suitable screws which are not shown. In the assembled state the two rims 2, 3 are thus fixed on the central carrier part 8 via the two damping elements 13, 14, as a result of which on the one hand the two rims 2, 3 are driveable in a common circumferential direction by means of a common drive and it is ensured in addition that the rims 2, 3 are relatively moveable omnidirectionally to one another and in the shown exemplary embodiment, additionally omnidirectionally to the carrier part 8 and thus to the Mecanum wheel axis of rotation 9 to a limited extent still to be explained later on.

FIG. 2 shows the construction of a roller 4 comprising a barrel-shaped sleeve contour already explained in connection with FIG. 1, comprising two part rollers 5, 6 which are rotatably mounted relative to one another and are spaced in the direction of the extension of a common roller axis of rotation. In the part rollers 5, 6, a bearing axis 17, 18 each extends from a middle region, i.e. from a carrier 19 that is merely hinted. Said carrier 19 is angularly fixed on one of the rims 2, and the bearing axes 17, 18 are either formed in one piece with said carrier or fixed on said carrier. The bearing axes 17, 18 on their respective side facing away from the carrier 19 have a free end and the part rollers 5, 6 are rotatably mounted via merely hinted rolling bearings 20, 21 relative to these.

FIG. 3 shows the Mecanum wheel 1 shown in FIG. 1 in exploded representation in an assembled state. Centrically evident is the hub region 11 comprising the shaft mounting 10 of the middle carrier part and one of the damping elements 14, which is arranged on the carrier part 8 via the mountings 15 arranged on an inner circle and is screwed to the second rim 3 on an outer rim via suitable mountings 15.

As a consequence, this produces a double arrangement of rollers in direction of the Mecanum wheel axis of rotation defined by the carrier part 12, wherein in the concrete exemplary embodiment always two double rollers are arranged next to one another and in the state of rest have roller axes of rotation which are orientated in parallel. Upon dynamic movement, a load-specific, limited vectorial alignment of the two (or multiple) rim axes of rotation takes place.

FIG. 4 shows a sectional view through an assembled Mecanum wheel 1, which is provided with omnidirectionally active damping means. Evident are the two rims 2, 3 with the rollers 4 fixed thereon via carriers 19 and arranged inclined with respect to the Mecanum wheel axis of rotation 9. Evident is the centric carrier part 8 with the damping elements 13, 14 laterally arranged thereon which are rubber elastic within certain limits, which in each case are fixed with one of the rims 2, 3 and on the inside with a circumferential ring 12 of the carrier part.

With the help of FIGS. 5 and 6, a possible relative adjustability of the two rims becomes evident. It is shown that the two rims 2, 3 are torsionable relative to one another—the damping elements 13, 14 allow this torsionability within certain limits. The torsionability or advantageousness is expressed in FIG. 6 when for example travelling over a hollow or a depression in a surface 22. The arrows in FIGS. 5 and 6 indicate the different relative directions of rotation.

FIG. 7 shows a Mecanum wheel 1 in a view of the "running surface". It is evident that at any point of time at least two contact points 23 between the Mecanum wheel 1 and the surface are ensured, as a rule even 4, wherein the contact points at any point in time are spaced from one another in the direction of the longitudinal extension of the Mecanum wheel axis of rotation and are formed or provided by different rollers or even part rollers.

FIGS. 8 and 9 show a relative further adjustability of the two rims 2, 3 of a Mecanum wheel 1 relative to one another. It is evident that a parallel displacement between the rims 2, 3, i.e. a relative movement perpendicularly to the Mecanum wheel axis of rotation 9 is possible. In other words, the damping elements 13, 14 are sheared in the process.

FIG. 10 shows a further relative adjustability. It is evident and schematically explained in FIG. 11 that a first rim axis of rotation 24 of the first rim 2 is relatively tiltable to a second axis of rotation 25 of the second rim 3. To this end, the damping elements 13, 14 are compressed in an in this case exemplarily upper region and in a radial region located diametrically opposite, in this case a lower region (elastically) stretched. In FIG. 11 it is evident that the rim axes of rotation 24, 25 include an angle $\alpha$ (tilting angle) and with the Mecanum wheel axis of rotation 9, a camber angle $\beta$, $\gamma$ in each case, while $\alpha+\beta+\gamma=180°$.

FIG. 12 shows a Mecanum wheel 1 with drive 26 and an additional mounting 27 in an exploded representation. The drive 26 is an electric motor, with a hub extension 28, which in the assembled state penetrates an opening 29 in a bearing arm 30.

The bearing arm 30 can be fixed to the drive 26 via openings 32 arranged over the circumference of the opening 29 in a flange region 31, as a result of which the drive 26, together with the bearing arm 30, is pivotable in a dampened manner. The drive 26 comprises a driveshaft 33, which can be inserted into the shaft mounting 10 of the Mecanum wheel 1 where it can be fixed. The driveshaft 33 in this case defines the Mecanum wheel axis of rotation 9 relative to the at least one rim axis of rotation, preferably, as shown in the exemplary embodiment, both rim axes of rotation 24, 25 are relatively moveable.

The bearing arm 30 can be fixed on a rubber spring element 34 formed as a torsion spring element on an end region facing away from the flange region, which permits a limited torsion movement T about a torsion axis $T_A$, as well as a tilting or pivot movement S, about an imaginary pivot axis $S_A$ running perpendicularly to the torsion axis $T_A$.

On the bearing arm 30 an inner housing shell 35 can be fixed, which partially surrounds the Mecanum wheel 1 in the assembled state. On the inner housing shell 35 an outer housing shell 36 can again be fixed. Both housing shells 35, 36 surround the Mecanum wheel 1, wherein a recess 37 for the ground contact of the rollers of the Mecanum wheel 1 is kept clear.

The invention claimed is:

1. A Mecanum wheel with a first rim (2) carrying a plurality of rollers (4) arranged next to one another in a circumferential direction each mounted about a roller axis of rotation (38) which is arranged angularly to a first rim axis of rotation (24), wherein a second rim (3) which is driveable via a common driveshaft (33) with the first rim (2) and carrying a plurality of rollers (4) arranged next to one another in circumferential direction each rotatably mounted about a roller axis of rotation (38) arranged angularly to a second rim axis of rotation (25), is connected to the first rim (2) via damping means (7), which are formed permitting a limited relative movement of the first and the second rim (3) to one another, wherein
the damping means (7) are formed permitting a dampened, limited relative movement between the first and the second rim (2, 3)
in circumferential direction
and/or
perpendicularly to a Mecanum wheel axis of rotation (9)
and/or
perpendicularly to the first and/or to the second rim axis of rotation (25)
and/or
tilt angularly relative to one another.

2. The Mecanum wheel according to claim 1, wherein the damping means (7) comprise at least one damping element (13, 14) of an elastomer material, which is connected to the first and/or the second rim (2, 3) in a fixed manner.

3. The Mecanum wheel according to claim 2, wherein the damping means (7) further comprise a carrier part (8) which is preferentially arranged between the first and the second rim (2, 3) and carrying the at least one damping element (13, 14), which carrier element (8) can be coupled to the common driveshaft (33) for the first and the second rim (2, 3).

4. The Mecanum wheel according to claim 3, wherein the carrier part (8) engages in the damping element (13, 14) via multiple extensions (39) extending parallel to Mecanum wheel axis of rotation (9).

5. The Mecanum wheel according to claim 1, wherein at least one of the rollers (4) of the first rim (2) and/or at least one of the rollers (4) of the second rim (3), comprise at least two part rollers (5, 6) which are rotatably mounted independently of one another.

6. The Mecanum wheel according to claim 5, wherein two part rollers (5, 6) of a roller (4) form a part roller pair and wherein the part rollers (5, 6) of the part roller pair are held by a carrier (19) which is arranged between the part rollers (5, 6).

7. The Mecanum wheel according to claim 6, wherein the carrier (19) each with a lateral carrier extension for carrying a rolling bearing (20, 21) each, extends into the part rollers (5, 6), wherein the carrier extensions each have a free end.

8. The Mecanum wheel according to claim 6, wherein the part rollers (5, 6) of a part roller pair are rotatable independently of one another about the same imaginary roller axis of rotation (38) or about rollers axes of rotation (38) which are arranged differently, angularly to one another.

9. The Mecanum wheel according to claim 6, wherein the part rollers (5, 6) of a part roller pair have a surface structure that differs from one another and/or a surface material that differs from one another.

10. The Mecanum wheel according to claim 5, wherein the at least one of the rollers (4) of the first rim (2) and/or the second rim (3) comprise barrel-shaped rollers.

11. The Mecanum wheel according to claim 1, wherein the rollers (4) of the first rim (2) and the rollers (4) of the second rim (3) have a surface structure that is different from one another and/or a surface material that is different from one another.

12. A vehicle having at least one Mecanum wheel (1) according to claim 1, which is assigned a drive (26) for driving the Mecanum wheel (1) about a Mecanum wheel axis of rotation (9).

13. The vehicle according to claim 12, the drive (26) of the Mecanum wheel (1) is assigned a bearing arm (30), which wherein is pivotable in a dampened manner in a limited angular range about a torsion axis ($T_A$) spaced from the Mecanum wheel axis of rotation (9) and/or is deflectable about a second bearing axis running perpendicularly to the torsion axis ($T_A$).

14. The vehicle according to claim 13, wherein the drive (26) of the Mecanum wheel (1) is assigned the bearing arm (30) by means of a torsion spring element (34).

15. The vehicle according to claim 12, wherein the vehicle is designed as a passenger vehicle and/or as a utility vehicle.

16. The vehicle according to claim 12, wherein the drive (26) is an electric drive (26).

* * * * *